BROADBAND RADIO RELAY SYSTEM IN WHICH SIGNALS FROM ADJACENT REPEATERS ARE COMPARED TO CONTROL GAIN OF EACH REPEATER

Filed Dec. 28, 1959 2 Sheets-Sheet 1

INVENTOR
N. E. CHASEK
BY F. W. Adams, Jr.
ATTORNEY

April 3, 1962 N. E. CHASEK 3,028,489

BROADBAND RADIO RELAY SYSTEM IN WHICH SIGNALS FROM
ADJACENT REPEATERS ARE COMPARED TO CONTROL
GAIN OF EACH REPEATER

Filed Dec. 28, 1959 2 Sheets-Sheet 2

INVENTOR
N. E. CHASEK
BY [signature]
ATTORNEY

United States Patent Office 3,028,489

Patented Apr. 3, 1962

3,028,489

BROADBAND RADIO RELAY SYSTEM IN WHICH SIGNALS FROM ADJACENT REPEATERS ARE COMPARED TO CONTROL GAIN OF EACH REPEATER

Norman E. Chasek, Red Bank, N.J., assignor to Bell Telephone Laboratories, Incorporated, New York, N.Y., a corporation of New York Filed Dec. 28, 1959, Ser. No. 862,220
10 Claims. (Cl. 250—15)

This invention relates to broadband radio relay systems and more particularly to improvements in radio relay systems utilizing traveling wave tube amplifiers.

Since its perfection, the traveling wave tube amplifier has offered many attractive advantages in the design of radio relay systems and many attempts have been made to simplify such systems through the use of this form of amplifier. These attempts have, in general, involved utilization of the very broadband performance of such tubes as linear amplifiers in more or less conventional systems. Inasmuch as such amplifiers provide substantial gains over broad bands of radio frequency signals, their use should greatly simplify the repeaters of radio relay systems. One or, at most, a small number of such amplifiers connected in tandem, comprise the entire signal path of the repeater. In extended systems, however, accumulated noise from atmospheric and other sources becomes a factor limiting the usefulness of linear systems.

The noise problem may, of course, be overcome or at least made nonlimiting by the use of regenerative systems such as those made possible by pulse code modulation techniques. Such systems, however, require relatively complicated timing and similar circuits at the repeaters and it is found that the over-all complexity of a radio relay system is not materially reduced by the introduction of the traveling wave tube amplifier as a substitute for the more commonly used broadband amplifiers.

It is accordingly the object of the present invention to utilize the advantageous characteristics of traveling wave tubes as multichannel amplifiers in broadband radio relay systems having high capacity and low cost.

In accordance with the above object, the traveling wave tube amplifier is employed in a broadband system in which pulse code modulation is used in the transmission of message information. A number of repeater sections link transmitting and receiving terminals. Only a small number of the total number of repeaters required between terminals are regenerative repeaters and the difficult requirements as to timing circuitry and the like are thus reduced. At the same time, performance of the over-all system is maintained at an acceptable level by exploiting certain of the characteristics of the traveling wave tube amplifiers used in the linear repeaters which make up the bulk of the system. Thus, the operating level of the traveling wave tube repeater at each of the nonregenerative repeater points is adjusted automatically to keep the total noise power of the signal at a level sufficiently low to meet the requirements for error rate for pulse code modulation transmission.

For this purpose, a sample of the level of the broadband signal received at each of the nonregenerative repeater points is sent to the preceding repeater in the chain and there compared with a reference level derived from the level of the broadband signal received at the preceding repeater. As a result of this comparison, a control signal is obtained and employed to adjust the level of the broadband signal transmitted from that repeater.

The above and other features of the invention will be considered in detail in the following specification taken in connection with the drawings in which.

Figure 1:
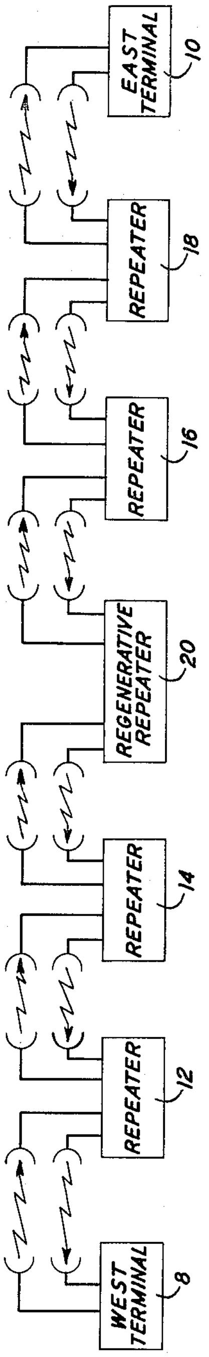
FIG. 1 is a block diagram of a broadband radio relay system according to the invention.

A typical broadband radio relay system, according to the invention, is shown schematically in FIG. 1. This system is a two-way system arranged to provide message transmission in either direction between a pair of terminals designated in the drawing as west terminal 8 and east terminal 10. Linking terminals 8 and 10 is a series of repeater sections including repeater stations and providing for transmission in either direction. Most of the repeater stations, such as 12, 14, 16, and 18, are simple nonregenerative repeaters and serve basically only to raise the level of a received signal for retransmission to the next repeater section. On the other hand, repeater 20 is a regenerative repeater which utilizes to the fullest extent possible the margin against signal loss by degradation of transmission inherent in the use of the pulse code modulation transmission technique. Although the system of FIG. 1 is shown as including repeaters in the ratio of one regenerative repeater for four nonregenerative repeaters, the various arrangements provided, according to the invention, make possible high quality transmission with extremely low error rates when only one out of twenty repeater stations includes regenerative equipment. This advantageous result is accomplished by utilization of certain characteristics of the traveling wave tube in the nonregenerative repeater stations.

The system philosophy upon which the present invention is based is that, for a given method of pulse coding and for a predetermined desired error rate, a determinable accumulation of total noise power can be permitted to occur before regeneration of the coded signal is necessary. Further, use is made of the characteristic of the traveling wave tube which results in the accumulation of a predetermined amount of intermodulation noise as the output signal level is increased. According to the invention, therefore, the operating level of the traveling wave tubes at each repeater is set in such a way that the ratio of signal-to-intermodulation noise is just equal to the ratio of signal-to-thermal noise, this latter source of noise being inescapable. If, because of atmospheric conditions, fading occurs in the microwave link between two repeater stations, the equality of the noise contributions from the two noise sources postulated above is lost. Accordingly, means are provided for detecting increases in propagation loss and for appropriately and automatically adjusting the operating level of the affected traveling wave tube amplifier to restore the operating conditions previously existing.

Obviously, the amount of accumulated noise which can be tolerated depends upon the characteristics of the transmission method and upon the frequency at which regenerative repeaters are provided. As is well known, pulse code modulation has a high degree of resistance against error accumulation in the face of background noise. However, because of the large bandwidth required in binary pulse code modulation, it has been difficult to fully exploit the noise advantage which it provides. More complicated forms of pulse code modulation in which a plurality of signal levels is possible for each element of the code have not been exploited because of the additional complications which they introduce at the repeater station. In the arrangement of the present invention, however, the relatively small number of regenerative repeaters required makes the over-all system particularly attractive for use with more complicated pulse codes, such as ternary pulse code modulation, or the like, although the advantages of the invention are obviously realized to a very significant extent regardless of the form of pulse code modulation employed.

Figure 2:
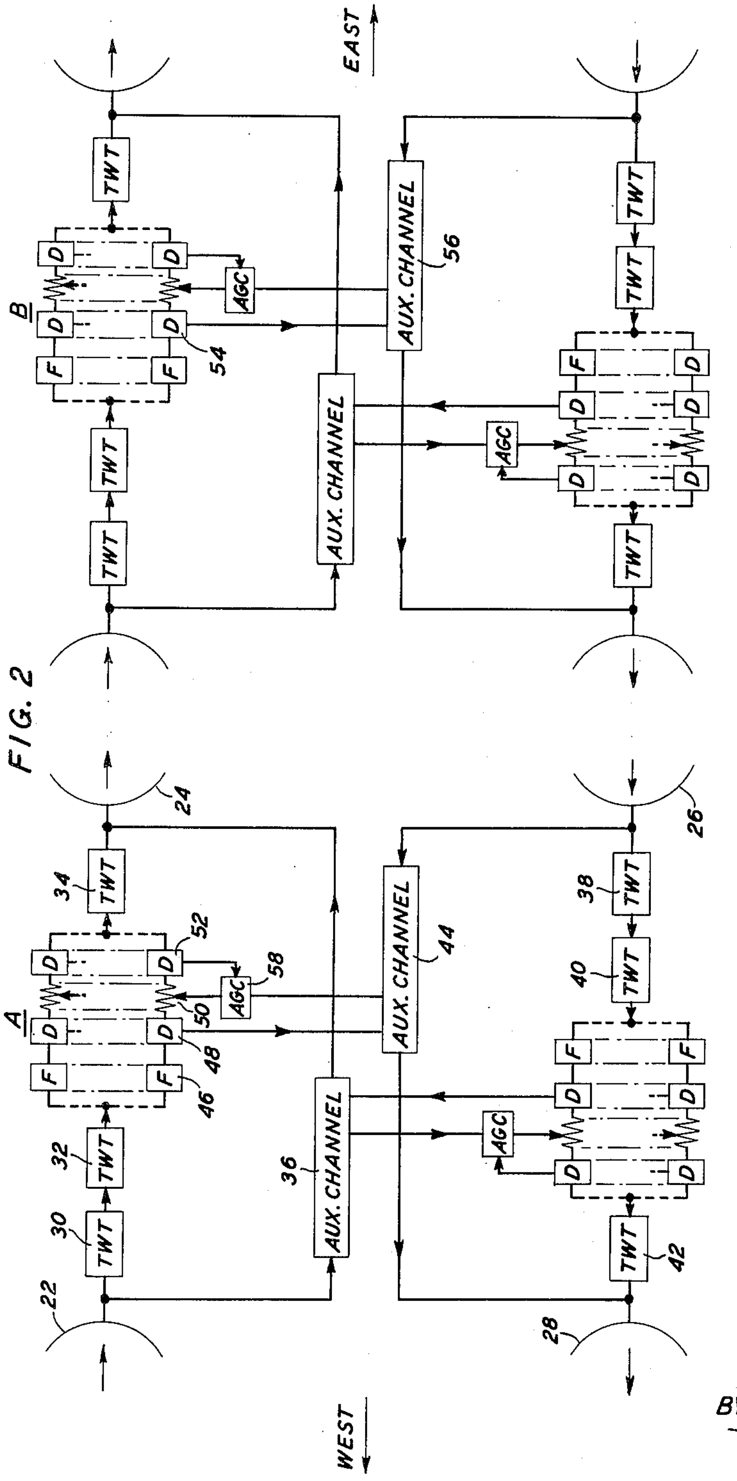
FIG. 2 is a block schematic diagram illustrating the arrangements employed at the repeater station of a two-way system.

The arrangements provided for the intermediate non-regenerative repeaters as, for example, repeaters 12 and 14 of FIG. 1, are shown in greater detail in FIG. 2, which illustrates two two-way repeaters A and B which are assumed to be connected in tandem between the east and west terminals of an extended broadband radio relay system. Repeaters A and B are identical and both are shown for the purpose of illustrating the manner in which they interact according to the invention.

In repeater A, for example, two broadband one-way channels are connectecd in opposite directions, the upper channel linking receiving antenna 22 and transmitting antenna 24 from west to east and the lower channel linking receiving antenna 26 and transmitting antenna 28 from east to west. The channel linking receiving antenna 22 and transmitting antenna 24 of repeater A is typical and comprises traveling wave tube amplifiers 30 and 32 which receive and amplify the broadband signal reaching antenna 22. Typically this signal may have a bandwidth of 500 megacycles and provide six 80 megacycle subchannels together with auxiliary channels to be employed for purposes which will be discussed hereinafter. At the output of traveling wave tube amplifier 32, the six subchannels are separated by conventional filters so that the message signals therein may be separately adjusted in level and are then recombined for application to a final traveling wave tube amplifier 34, the output of which is applied to transmitting antenna 24. The auxiliary channel 36 is connected directly from receiving antenna 22 to transmitting antenna 24 and includes its own traveling wave tube amplifier, as will be considered in detail hereinafter.

The other channel of repeater A includes traveling wave tube amplifiers 38 and 40 and output traveling wave tube amplifier 42. This channel also is provided with an auxiliary channel 44 connected directly between receiving antenna 26 and transmitting antenna 28.

It will be recalled that, according to the invention, the level of signals radiated from a repeater station is so adjusted that the signal-to-intermodulation noise ratio is just equal to the signal-to-thermal noise ratio. This is accomplished by determining at one repeater station the level of the received signal and transmitting this information back to the preceding station in the system for use at that station in adjusting the level of the broadband signal radiated therefrom. This arrangement serves to combat fading in the propagation paths between repeaters and limits the accumulation of possible noise in the signal to a predeterminable value. This value is chosen on a statistical basis having in mind the characteristics of the pulse code employed and the fact that severe propagation degradation rarely occurs simultaneously in more than one link at a time in a tandem-connected multilink system.

Thus, at each repeater station, the level of the signal applied to the final amplifier is adjusted after comparison between the level of the signal received at that repeater station and that received at the next succeeding repeater station to maintain a predetermined output level chosen in accordance with the criterion mentioned above. In order to meet this criterion, the design of the transmitter level control circuitry must incorporate a means for satisfying the following: (1) The signal-to-intermodulation noise usually increases 2 db for every 1 db increase in transmitted power for all channels, whereas the signal-to-thermal noise increases 1 db for every 1 db increase in transmitted power. (This is for a given saturation power level in the transmitting amplifier and a given change in path loss for all channels.) (2) In the case of frequency selective fades, the decrease in signal-to-intermodulation noise for all channels is less than 2 db for a 1 db increase in transmitted power in the most severely faded channel. The exact decrease will hinge on the specific system design. The required non-linear level control characteristic can be obtained through conventional nonlinear circuit design as, for example, through the use of solid-state diode networks. Thus, and as shown in FIG. 2, each of the subchannels as, for example, those of the west-east repeater, comprises a filter 46 which acts together with the corresponding filters of the other five subchannels to divide the received broadband signal into subchannels, each corresponding to an individual message to be transmitted. The level at the output of filter 46, for example, is measured by a detector 48 and applied over a variable attenuator 50 to the input of the final traveling wave tube amplifier stage 34 to which also are applied the outputs of the other five subchannels.

A second detector 52 serves to monitor the level of the signals applied to the final traveling wave tube amplifier 34. The output of level detector 48 is applied to the auxiliary channel 44 in the east-west section of the repeater and is transmitted over this channel to the preceding repeater station in the chain. In a similar fashion, the level information measured by detector 54 in the west-east channel of repeater station B is transmitted over auxiliary channel 56 of the east-west section of that repeater to receiving antenna 26 and thus applied to auxiliary channel 44 of repeater A. This signal is separated from the other signals in the auxiliary channel by conventional means and is applied as one input to an automatic gain control unit 58 in the west-east portion of repeater A. It will be understood that although the channel-branching filters, level-monitoring detectors, and automatic gain control units are shown only for a single subchannel of repeater A, these elements are duplicated in each subchannel of each repeater and, further, that level information, individual to each of the subchannels and each repeater, is obtained and transmitted over the auxiliary channel to the next repeater in the system.

At repeater A, for example, the level of the signal applied to the final traveling wave tube amplifier 34 is set to a reference value by adjustment of attenuator 50 and held to that value by the operation of automatic gain control unit 58. Unlike the more conventional automatic gain control system, however, automatic gain control unit 58 receives a control quantity which represents the difference between the output of detector 52 of the associated subchannel at repeater station A and the output of detector 54 for the corresponding subchannel of repeater station B, which is the next repeater station in the series linking the base stations of the system. The automatic gain control quantity, then, represents the difference between the level of the signal radiated from repeater station A and that received at repeater station B and thus varies as the variations occur in the propagation of microwave signals between repeaters.

Figure 3:
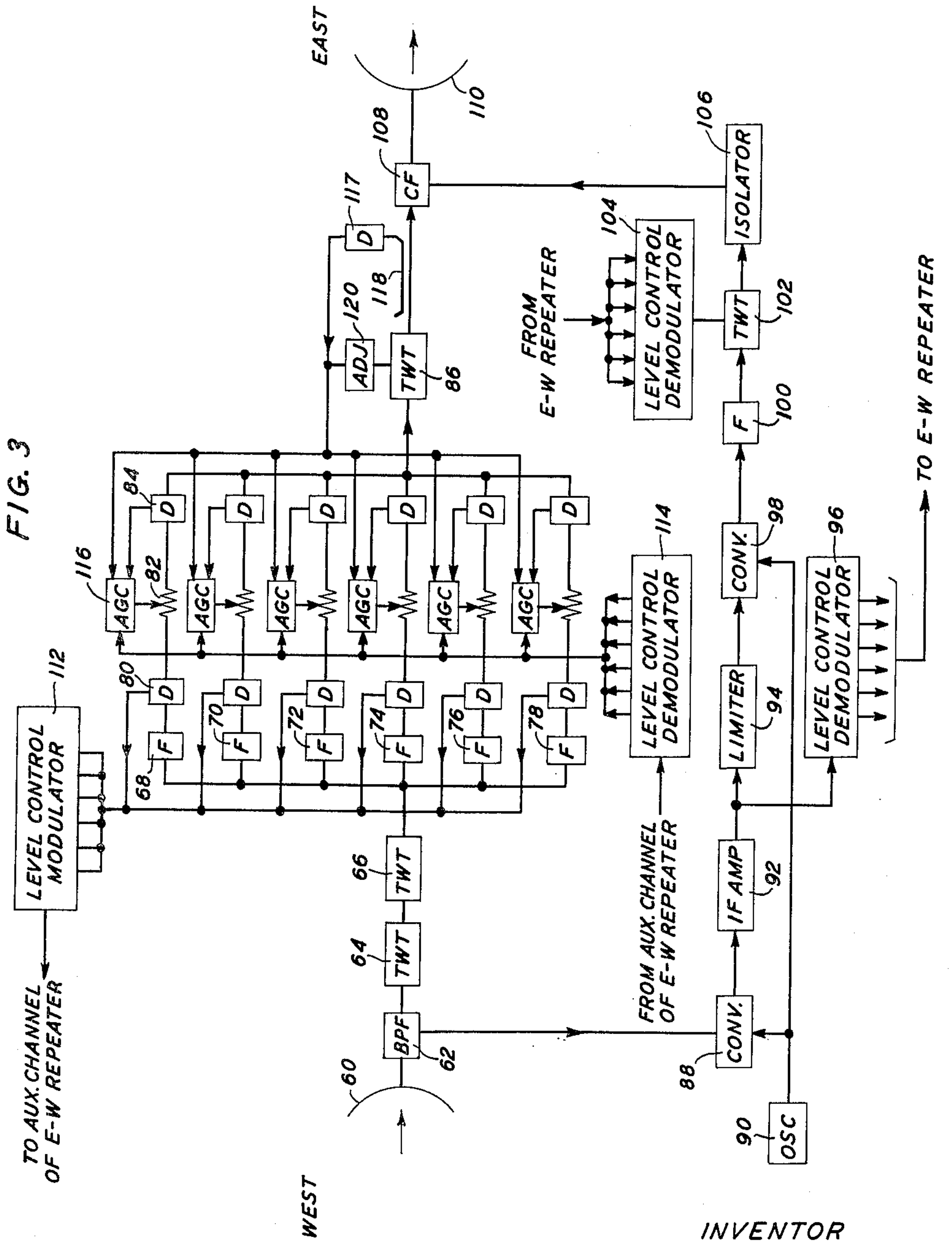
FIG. 3 is a block schematic diagram showing the detailed circuit arrangements of a single one-way repeater.

The circuit arrangements for a single direction of transmission for a single repeater are shown in greater detail in FIG. 3 of the drawings. Here, the west-east channel corresponding to the upper channel of repeater A is shown. Of the broadband signal reaching receiving antenna 60, that subchannel portion corresponding to the auxiliary channel is separated from the balance of the signal by a bandpass filter 62 and the balance of the brodband signal is applied to input traveling wave tube ampilfier 64. The signal appearing at the output of traveling wave tube amplifier 64 is further amplified by traveling wave tube amplifier 66 and applied as the common input to channel-branching filters 68, 70, 72, 74, 76, and 78 by which the broadband signal is divided into six subchannels. The subchannel occurring at the output of filter 68 is typical and includes an input level detector 80, a variable attenuator 82, and an output level detector 84. The output of the subchannel is combined with the corresponding outputs of the remaining subchannels for application to the final traveling wave tube amplifier 86 of the repeater.

The auxiliary channel output isolated by bandpass filter 62 is applied as one input of a converter 88 to which is also applied the output of a beating oscillator 90. The resulting intermediate frequency signal is applied to an intermediate frequency amplifier 92 and the output of amplifier 92 is applied both to a limiter 94 and a demodulator 96. Demodulator 96, the nature of which depends upon the method employed in modulating level control information on the auxiliary channel, includes means for demodulating and yielding as separate outputs the level control information for each of the six subchannels derived from the next repeater to the west in the system. Conveniently, such information is transmitted over the auxiliary channel by amplitude modulation and demodulator 96 is an amplitude-modulation detector of conventional nature and includes the filters et cetera required to separate the level information signals for the several subchannels. According to the invention, this level control information will be applied to the east-west section of the repeater, of which FIG. 3 illustrates the west-east section to control the level of signals transmitted to the next repeater to the west.

The output of limiter 94 represents the intermediate frequency of the auxiliary channel without the amplitude modulation corresponding to level control signals and may, after return to radio frequency by a converter 98 to which is also applied the output of oscillator 90, be applied through a filter 100 to a traveling wave tube amplifier 102, there to serve as an auxiliary channel carrier for further transmission along the radio relay system. Here, level control information from the east-west section of the repeater under consideration is applied to traveling wave tube amplifier 102 by level control modulator 104. This information will, according to the invention, be transmitted to the next repeater station to the east, there to control the level of the signals transmitted to the repeater station under consideration in the east-west direction. An isolator 106 prevents interaction between the auxiliary channel and the principal broadband channel which are combined in a combining filter 108 for application to transmitting antenna 110.

A level control modulator 112 corresponds to level control modulator 104 and is associated with the auxiliary channel of the other section of the repeater of FIG. 3. The function of this level control modulator is to accept the level control information derived from detector 80 of the first subchannel and the corresponding detectors for the remaining subchannels for the west-east section of the repeater and to modulate them upon the auxiliary channel for transmission to the next repeater to the west.

The application of the level control information derived from the next repeater to the east in the determination of the operation of the west-east repeater shown in FIG. 3 may now be considered. This information is derived from level control demodulator 114, which is associated with the east-west auxiliary channel and corresponds to the level control demodulator 96 shown in FIG. 3 for the west-east auxiliary channel. The six output leads of level control demodulator 114 are taken as individual outputs, each bearing information as to the level of the signal received at the next repeater to the east from transmitting antenna 110 of FIG. 3. These six outputs are applied respectively to automatic gain control units for the six subchannels as typified by automatic gain control unit 116 of the first subchannel shown at the upper part of FIG. 3. Automatic gain control unit 116 forms a part of a conventional automatic gain control loop in which the level of the signal present in that subchannel is detected by detector 84 and compared wtih a reference to derive a control quantity which serves to adjust variable attenuator 82. It will be recognized that variable attenuator 82 is shown only in a symbolic fashion. In the actual circuit, this device, for example, might comprise a ferrite attenuator and the output of the automatic gain control unit might comprise the magnetizing current for the ferrite element. The output of the level control demodulator 114 corresponding to the first subchannel is also applied to automatic gain control unit 116 and there compared with that obtained from detector 84. The difference between these two quantities serves as the automatic gain control output. Since the quantity derived from level control demodulator 114 represents the received signal level at the next repeater for this particular subchannel, and the quantity derived from detector 84 represents the transmitted signal level, appropriate adjustment of the internal constants of the automatic gain control unit may serve to maintain this difference at any desired level.

Also, in accordance with the invention, the level of the output signal comprising the combined subchannel outputs is sampled at the output of traveling wave tube amplifier 86 by a detector 117 connected to the main transmission channel of a directional coupler 118. The quantity appearing at the output of detector 117 is applied to a unit 120 and serves to adjust the cathode current of traveling wave tube amplifier 86 conveniently, for example, by varying the anode potential applied thereto. Since such variation of the cathode current of traveling wave tube amplifier 86 acts also to vary the gain of this traveling wave tube as an amplifier, the control quantity derived from detector 117 is also applied as an auxiliary input to the automatic gain control units of the several subchannels. Here, this quantity acts to modify the action of the automatic gain control in such a way as to compensate for the change in gain of traveling wave tube amplifier 86. Reduction of cathode current of traveling wave tube amplifier 86 to the extent made possible by the automatic level control of the invention serves materially to increase the life of the traveling wave tube since it need operate at full saturation power only in the presence of maximum fading in the propagation path and may be operated at much lower levels most of the time.

What is claimed is:

1. In a broadband communication system, a pair of terminal stations, repeater stations intermediate said terminal stations, means at each repeater station for adjusting the level of the signal radiated therefrom in accordance with the level of the signal received at the next repeater, and means for transmitting information as to received signal level from each repeater to the preceding repeater of the system.

2. In a broadband communication system, a pair of terminal stations, a plurality of repeater stations intermediate said terminal stations, means for transmitting pulse modulated signals between said terminals by way of said repeater stations, and means for adjusting the output level at each repeater station in accordance with the difference between the signal received at the repeater and that received by the next succeeding repeater of the system.

3. In a broadband communication system employing pulse code modulation, a pair of terminal stations, a plurality of repeater stations intermediate said terminal station for the transmission of broadband radio signals between said stations, and means responsive to the level of signal received at a repeater station to adjust the level of the signal transmitted from the previous repeater station to maintain the ratio of signal-to-thermal noise equal to the ratio of signal-to-intermodulation noise in the signal transmitted from said previous repeater station.

4. In a broadband communication system employing pulse code modulation, a pair of terminal stations, repeater stations intermediate said terminal stations, means at each repeater station for producing a control signal proportional to the level of the broadband signal there received, means for transmitting said control signal to both the preceding and succeeding repeater stations of said system, means at each repeater for comparing the control signals received from the preceding and succeeding repeaters, and means for adjusting the level of the broadband signal transmitted from each repeater to maintain the difference between the control signals there received at a predetermined value.

5. In a broadband communication system employing pulse code modulation, a pair of terminal stations, a plurality of repeater stations intermediate said terminal stations for the transmission of broadband radio waves therebetween, at least one of said repeater stations including equipment for regenerating such broadband signals, and means at each of the remaining repeater stations for adjusting the level of the signal radiated therefrom in accordance with the level of the signal received therefrom at the next repeater of the system.

6. In a broadband communication system, a pair of terminal stations, a plurality of repeater stations linking said terminal stations for the transmission of broadband signals, means at each repeater station for generating a quantity proportional to the difference between the level of signal received at said repeater station and that level of signal received by the next succeeding repeater station of the system, and means responsive to said quantity for maintaining the level of the signals radiated from that repeater station at a predetermined level.

7. In a broadband communication system, a pair of terminal stations, a plurality of repeater stations linking said terminal stations for the transmission of broadband signals therebetween, means at each repeater station for subdividing said broadband signals into a plurality of message channels, and means for adjusting the output level of the individual signals in said message channels in accordance with the difference between the level of the signals received by said individual message channels and the level of the signals received by the corresponding ones of said individual message channels at the next succeeding repeater stations of the system.

8. In a broadband communication system, a pair of terminal stations, a plurality of repeater stations linking said terminal stations for the transmission of broadband signals therebetween, means at each repeater station for subdividing said broadband signals into a plurality of message channels, means for adjusting the level of the individual signals in said message channels in accordance with the difference between the level of the signals received by said individual message channels and the level of the signals received by the corresponding ones of said individual message channels at the next succeeding repeater stations of the system, means for combining said message subchannels after level adjustment, and means for amplifying said combined channels for radiation to the next succeeding repeater station of the system.

9. In a broadband communication system, a pair of terminal stations, a plurality of repeater stations linking said terminal stations for the transmission of broadband signals therebetween, means at each repeater station for subdividing said broadband signals into a plurality of message channels, means for adjusting the level of the individual signals in said message channels in accordance with the difference between the level of the signals received by said individual message channels and the level of the signals received by the corresponding ones of said individual message channels at the next succeeding repeater stations of the system, means for combining said message subchannels after level adjustment, means for amplifying said combined channels for radiation to the next succeeding repeater station of the system, means for detecting the level of the combined signal, and means for adjusting the saturation power of said final amplifying means in accordance therewith.

10. In a broadband communication system, a pair of terminal stations, a plurality of repeater stations linking said terminal stations for the transmission of broadband signals therebetween, means at each repeater station for subdividing said broadband signals into a plurality of message channels, means for adjusting the level of the individual signals in said message channels in accordance with the difference between the level of the signals received by said individual message channels and the level of the signals received by the corresponding ones of said individual message channels at the next succeeding repeater stations of the systems, means for combining said message subchannels after level adjustment, means for amplifying said combined channels for radiation to the next succeeding repeater station of the system, means for detecting the level of the combined signal, means for adjusting the saturation power of said final amplifying means in accordance therewith, and means for adjusting the level of the signals in said individual subchannels in accordance with the changes in gain of said final amplifying means produced by changing the saturation power thereof.

References Cited in the file of this patent

UNITED STATES PATENTS

| | | |
|---|---|---|
| 2,892,930 | Magnuski et al. | June 30, 1959 |
| 2,908,760 | Stachiewicz | Oct. 13, 1959 |